May 21, 1940.  R. J. PARSONS  2,201,916
BUS HEATING SYSTEM
Filed Feb. 20, 1936
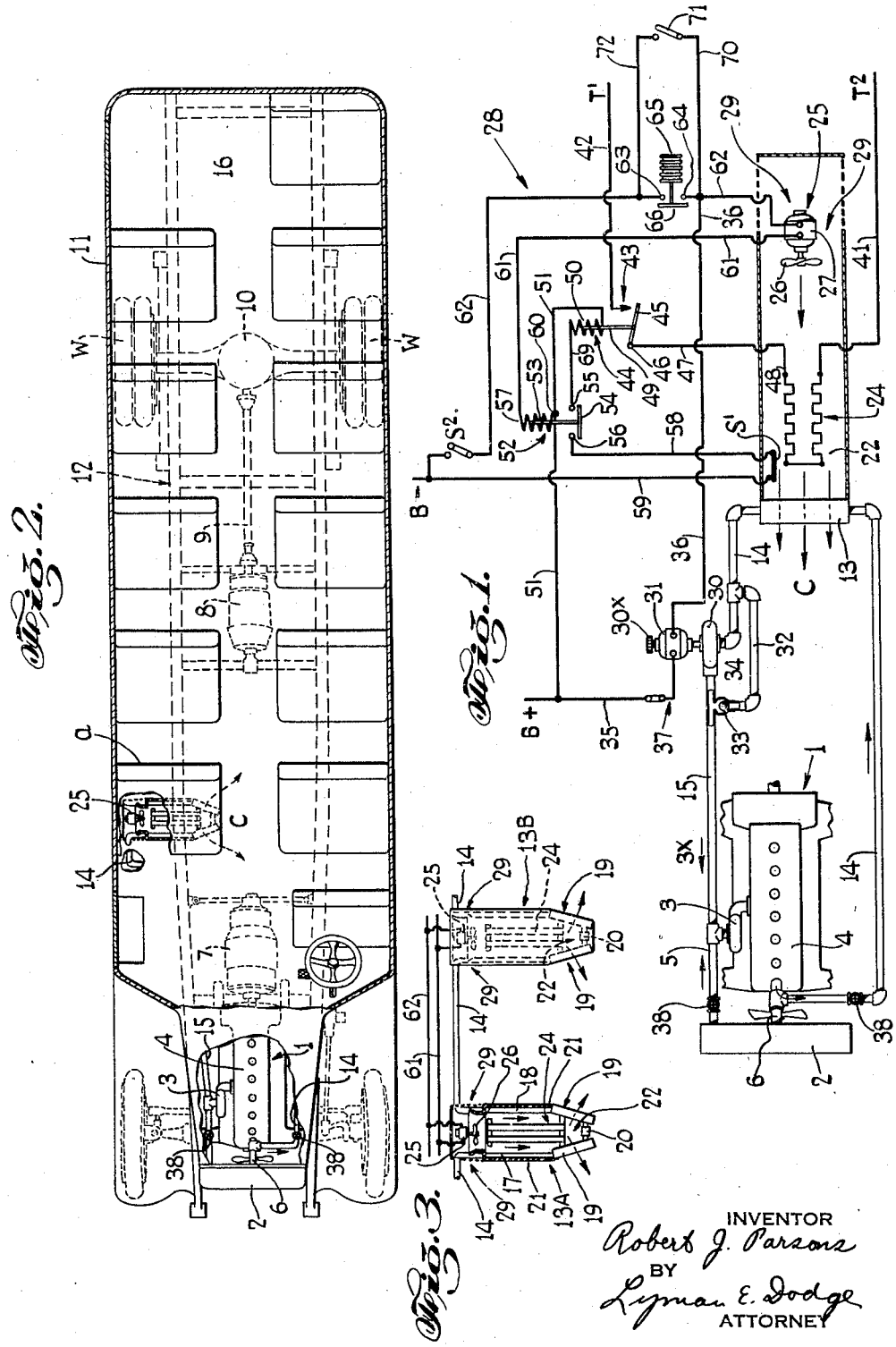
INVENTOR
Robert J. Parsons
BY
Lyman E. Dodge
ATTORNEY Patented May 21, 1940

2,201,916

UNITED STATES PATENT OFFICE 2,201,916

BUS HEATING SYSTEM

Robert J. Parsons, Schenectady, N. Y., assignor to Consolidated Car - Heating Company, Inc., Albany, N. Y., a corporation of New York Application February 20, 1936, Serial No. 64,881

6 Claims. (Cl. 237—2)

This invention relates to heating systems for vehicles, especially systems for heating automotive vehicles, and more particularly to a system for heating a passenger bus of the class commonly referred to as "all-purpose" busses, which includes the so-called "gas-electric" type of bus, and the so-called "gas-trolley" type of bus, to both of which types the invention herein disclosed is particularly applicable; although adapted for embodiment in other types of busses as well. By the term "gas-electric" bus, as used hereinafter, is designated such a vehicle equipped with a power plant including an internal combustion engine and a dynamo by which is driven an electric motor, or a plurality of motors, so that the bus can be driven under self-generated power, both gas and electric. The "gas-trolley" type of bus is provided with an internal combustion engine and with an electric motor, by either of which it may be driven selectively, but is dependent upon an outside source of electrical current for electric power. Busses of each of the above types are therefore also equipped with a suitable outside current collecting appliance adapted to derive an electric power current from a suitable outside conductor, the bus then operating as a "trackless" trolley or bus, the mode of operation being selectively within the control of the operator by means of suitable known controlling devices.

The passenger compartment of a gas-electric bus or of a gas-trolley bus is desirably heated by hot water derived from the jackets of the engine when the latter is being used as the source of power, the hot water being circulated through radiators in, or communicating with, the passenger compartment, and the heat thus provided being generally circulated by fans.

Such a method of heating has the disadvantage that when operating with electric current derived from the above mentioned outside conductor, the engine will not be running, heated water will not be available to heat the passenger compartment, and as the water in the conventional engine radiator is not circulated or heated, it will be likely to freeze under the conditions frequently encountered in the operation of these "all-purpose" busses. The importance of this defect of existing conditions is apparent when it is understood that such a bus is often in service upon runs where the operation will change from gas or electric to outside electric and vice versa several times a day; or it may be operated in either type of service for several days at a time.

An object of the present invention is to provide a heating system for such a bus which will not only utilize the heat from the engine to warm the passenger compartment, but will also obviate the above recited defect and insure proper heating of the passenger compartment when the engine is not in operation, and consequently hot water from the engine is not available for such heating.

A cognate object of the invention is to provide such a bus with a combination electric-hot water system, including means by which the water in the radiator-cylinder-jacket cooling system will be warmed and circulated even when the engine is not operated, so that the water in the engine cooling system will not freeze, and also the engine will be desirably warm when it is to be started. For such heating of said system, the invention makes available preferably the heating means employed to furnish heat to the passenger compartment, and preferably provides for such a heating effect electrical heating elements suitably energized as by the power current supplied to the electric motor, from any suitable source of such current, such as an outside conductor; or otherwise energized as by an auxiliary storage battery system.

Another object of the invention is to organize the several heat-interchanging instrumentalities comprised, in a compact system adapted to carry the invention into effect with optimum use of the confined spaces available for such an installation in a passenger bus of the "all-purpose" and to provide, in a system so organized, electrical energizing and controlling circuits with centralized controlling devices so disposed as to afford means for effecting in a convenient and safe manner the operation of the system in its various combinative arrangements.

Other objects and advantages will appear as the description of the particular physical embodiment selected to illustrate the invention progresses, and the novel features of the invention will be particularly pointed out in the appended claims.

In describing the invention in detail and the particular physical embodiment selected to illustrate the invention, reference will be had to the accompanying drawing, and the several features thereon, wherein like characters of reference designate corresponding parts throughout the several views, and in which:

Fig. 1 shows, in somewhat schematic form, and viewed in plan, a heating system for a gas-electric bus or "all-purpose" automotive vehicle, in the construction of which my invention has been embodied: a diagram of electrical operating and controlling circuits being also included in this figure;

Fig. 2 is a sectional view showing in plan the passenger compartment of such a bus, so equipped with a system of heating units according to the present invention;

Fig. 3 is a fragmentary detail view, similarly in plan, on an enlarged scale, of two of the heating units, as shown in Fig. 2, illustrating somewhat schematically the mode of interconnecting the same electrically and for transfer of heat.

The numeral 1 designates generally an internal combustion engine, shown in place at the forward end of an "all-purpose" bus or automotive vehicle of the gas-electric type, the engine constituting part of a power plant which also includes a radiator 2 forming part of the cooling system of the engine. 3 is a pump for circulating the cooling water or other cooling medium through the water jackets 4 and water circulating conduits 5 and 6, all of which parts may be of conventional form, as shown, or of any suitable construction.

The power plant of a bus of the gas-electric type, as in the instance illustrated, is conventionally equipped also with a dynamo, as 7, and electric motors, of which one is shown at 8, the latter being adapted to drive the vehicle through the medium of a transmission shaft 9 and a differential gearing box 10. The electric motor 8 may also derive its energizing electric current from any suitable source, such for example as a power current conductor outside of the bus, in which event the bus will operate as a "trackless" trolley or vehicle, being equipped suitably with a traveling contact maker (not shown), adapted to collect the current from an overhead wire or a conduit power system as the case may be. It is not meant, however, to exclude provision for actuation of the bus by a self-contained source of electric current, such as a storage battery.

Suitable controlling mechanism and devices of known or other form will of course be provided to permit the bus to be operated selectively as a "gas-electric," or as a "trackless" vehicle, and it is to be understood that the instrumentalities to which reference has already been made are indicated in an illustrative manner and not by way of limitation, the position of these various devices and their combinative relationship to each other being capable of extended variation by those skilled in the art of constructing gas-electric vehicles.

The body of the vehicle is designated generally by the reference character 11, and the chassis as 12, and Fig. 1 of the drawing shows also diagrammatically at 13 a heating element adapted to utilize fluid as the heating medium, as for example water, and conduits 14, 15 adapted to effect intercirculation of the fluid between said heating element and the fluid-circulating parts 2, 4, 5, 6, of the internal combustion engine. The conduit 14 runs from the conventional jackets 4 of the fluid cooling system of the engine to the unit 13A, which may conveniently be disposed under a seat $a$ in the passenger compartment 16, and branches 17 and 18 are connected into the ends of a pair of fluid-filled radiators 19, 19, which are shown as spaced apart on each side of the longitudinal axis of the seat, the members of each pair in a unit being connected to each other near the aisle by a coupling pipe 20. These heating members may desirably be of similar structure to that of the conventional radiator 2, and each pair of members 19 thus provided is surrounded by the walls 21 of a compartment 22 of which the side walls are constituted in part by the radiators 19, as shown, the latter being arranged in V-shaped relation, so as to direct the heated air from each radiator 19 into the aisle C, as indicated by arrows in Figs. 2 and 3, away from the legs of the passengers, and preferably under forced draft.

In Figs. 2 and 3, two of the heating units, as 13A and 13B, of which there may be any suitable number serving in the aggregate to make up what is schematically indicated at 13 in Fig. 3, are shown in sufficient detail to illustrate a convenient and suitable disposition of them and their connections both as to the air and water circulation and as to electrical energization.

In the instance illustrated, each unit compartment 22 is of suitable dimensions and shape to contain a pair of electrical resistor heating elements 24 adapted to be energized by electrical current received from any suitable source thereof, such as the power current used to energize the electric motor 8. Any well-known or commercial form of electrical heating element may be utilized for this purpose.

In order to provide for circulation of air under forced draft, I have shown a series of blower units designated generally by the numeral 25 and each of which includes a fan 26 driven by an electric motor 27, the latter being energized by the power current, or by current supplied by a suitable bus-carried source, and all of the electrical instrumentalities being under manual control by electrical controlling devices suitably placed in the body of the car, as indicated at 28 in Fig. 1, this position in Fig. 1, being, however, purely diagrammatic.

In the instance illustrated it is contemplated that the normally contained air of the bus will be re-circulated primarily, but provision for drawing in a supply of atmospheric air, as through a suitable grating (not shown) opening to the atmosphere may be made, in usual fashion, or in any suitable manner, at one or more convenient regions of the bus. The air drawn into each unit, as at 29, is forced by the blower 25 through the heating compartment 22, past the electric heating elements 24 and out through the radiators 19 into the passenger compartment C, so that the latter can be heated by air circulated through the aforesaid compartment. Each compartment 22 is preferably provided with a grating at the intake 29, on on each side of the unit.

It will be readily apparent that when the engine 1 is in operation, the heated water or other fluid from jackets 4 will circulate through the conduit 14, passing in series through a branch 17 to the radiators 19 of the unit, in series, and thence back by a branch 18 to a stretch of conduit 14 connecting the units adjacent to each other, and finally, at the other end of the bus will pass over to the conduit 15 and back to the conventional pump 3. When thus operated, the air, circulated as above described, will be heated in passing through radiators 19 by the heat derived by those radiators from the heated fluid circulated by pump 3 through conduits 14 and 15 as already described.

When the bus is to be operated by electrical current, ordinarily the engine will be inoperative, a clutch (not shown) being thrown out so that the dynamo 7 will not be driven, and the motor 8 will be included in the power current circuit used, of whatever form, deriving its current for example from an outside source by suitable means, as through a trolley, which is not shown but which is indicated schematically by the reference characters T¹, T² in Fig. 1.

It will be understood that when actuated electrically, if the engine be not operated, no heat will be received from the engine and other means must be provided to heat the passenger compartment.

In pursuance of an object of the invention above stated, there may be utilized, at such times, the electrically energized heating elements 24, which are, as already described, interposed in the path of the incoming supply of air entering each compartment 22 from the passenger compartment through the grating or registers 29, prior to its passage through radiators 19 and subsequent delivery to the passenger compartment therefrom.

By the above provision it is possible not only to furnish the passenger compartment with heated air, but it will be apparent that by associating the heat interchanging instrumentalities in the relationship already described, provision is made for utilizing in transit a certain portion of the heat being transferred, through the medium of the air supply to the passenger compartment, to heat the radiators 19.

As these radiators are still coupled into the circulating system of the engine, the fluid in said system will now be heated in the radiators 19 instead of in the water jackets 4 of the engine, thus reversing the system, and accordingly the water circulated will transfer to the engine a sufficient amount of heat to obviate any danger of injury by possible freezing of the said jackets or of the radiator 2 when the temperature of the surrounding atmosphere is below the freezing point. The engine will also be kept desirably warm for starting.

In connection with the above disclosure it is to be noted that, by the illustrative description of radiators utilizing as a heating medium fluid derived directly from the conventional water or fluid-cooled equipment of an internal-combustion engine, it is not intended to exclude the desirable use of steam, for example, derived from any source, as from a boiler heated by the exhaust of an engine, or otherwise.

Valves may be provided as at 38 to shut-off the circulation of fluid in part or entirely, as for example when it is not desired to heat the passenger compartment in summer. At such times the electric heaters 24 may be likewise switched off and the circulated air may be utilized in the ordinary manner without any essential alteration in the parts or their structural organization.

It will be understood by those skilled in the art that suitable thermal cut-outs and other regulating or controlling apparatus of an automatic or manually controlled type may be provided, whether of conventional or any suitable construction, and a form of circuits so provided will be described in connection with a more detailed description of the schematic arrangements of Fig. 1.

It will be noted that inasmuch as the pump 3 is not operated when the engine 1 is not being operated, and as it is not desirable nor economical to operate the engine simply for the purpose of actuating the pump 3, some other means should desirably be provided for inducing positively the circulation of fluid in the conduits 14 to permit reversal of the system effectively as above described.

A relatively feeble flow of fluid will suffice for this purpose, and is indeed desirable, to avoid an undesirable cooling action, and any convenient means may be provided. As a now preferred form of means to maintain such a flow, I have shown at 30 an auxiliary pump, preferably of the centrifugal type which is included in the main conduit 15 as at 34, so that when necessary the pump 30 may be utilized for the intended purpose. Inasmuch as an adequate supply of electrical current from a battery will be available ordinarily as a source of operating current for various puposes, I prefer to provide an electric motor 31 for use in actuating the pump 30, and this motor may be conveniently connected, as by conductors 35, 36, etc., in parallel with the other blower motors 27, as indicated in the diagram of Fig. 1, to be described more at length hereinafter. A manually operable switch 37 may be provided, as usual, to permit this pump to be cut-out of circuit when the main pump 3 is operating, or at other times when the pump 30 is not required. The pump 30 may also be driven by mechanical connections from the driving shaft, at such times as it may be desirable to utilize power from the axle.

In order that the pump 30 may not interfere undesirably with circulation through conduits 14, 15 when the pump 3 is in operation, I may provide as at 32 a by-pass, in which is included a check valve such for instance as a ball-check-valve 33, which permits circulation of fluid in the direction of the arrow 3X (see Fig. 1) so that the ordinary flow of fluid is practically unhampered while the pump 3 is working. When the system is reversed and the pump 30 is working it will be understood that the latter will cause a flow of fluid in the direction indicated by the arrow 3X and inasmuch as back flow will be checked by the ball valve 33 all circulation of fluid will then be under the influence of the auxiliary pump 30.

Fig. 1 embodies a schematic flow sheet or diagram illustrative of the already described relationship of the various devices and circuits in which the heating system of the present invention has been embodied by way of example, and in connection with which its now-preferred mode of operation may be understood, from the following description: Under ordinary conditions of operation, when the bus is being driven by power generated by the internal combustion engine 1, operating the dynamo 7 which in turn energizes the electric motor 8 and, through the shaft 9 and differential gearing 10, operates the driving wheels W of the bus, heating of the bus will be effected by the heating units 13A, 13B, etc., which are represented schematically in Fig. 1 by the single conventional radiator element designated 13. The latter is filled with fluid of the same character as that utilized in the jackets 4 as the medium for cooling the engine, the conventional circulation being, as usual, from the front radiator 2 through pipe 5, to pump 3, to jackets 4, to conduit 6, and back to radiator 2.

When hand valves 38 in the conduits 14 and 15 are open, this circulation of cooling fluid, which has been heated in the engine jackets 4, will be extended to the radiator system 13, so that any air passing through the latter in the direction of the arrows in Fig. 1 will receive heat, which will be transferred to the air in the space to be heated, as for example the passenger compartment of the bus, represented by the reference character C in Fig. 1 and shown more in detail in Fig. 2.

During such circulation, the resistance of the auxiliary pump 30 will cause the circulating fluid to detour through the by-pass 32, the check valve 33 yielding to permit such flow, and at this time there will be desirably a very active flow under the impulsion of the pump 3, so that a large amount of heat can be transferred from the engine jackets 4 to the compartment C by the fluid passing through radiator 13. Such flow of course can be regulated by proper setting of the valves 38, without interfering in any way with the ordinary cooling function of the engine cooling system, inasmuch as the conduits 14 and 15 are in shunt to the regular cooling system.

The flow of air in circulation through radiator 13 may be enhanced by suitable air-circulating means, preferably the motor, or motors, or blower units 25 in the individual compartments 22, the air being drawn in at 29 as already described and forced out through the radiators 19 shown in Figs. 2 and 3.

Should it be desired to provide the air thus circulated with an increment of heat in addition to that derived from the engine-heated fluid as the circulated air passes through the element or elements 13, such heat may be supplied in suitable fashion, as by the electrically operated heating element 24, taking the form of a resistor or resistors as already described. When so utilized, the element 24 is preferably energized by electric current derived from such a source as the dynamo 7, or from an outside conductor, indicated at T¹ and T² in Fig. 1, which may be considered to represent the trolley connections; or from any bus-carried source which may be available.

The present description contemplates the use of current from either of the first two sources, and will be directed more particularly to these in order that various controlling devices with which the bus is preferably equipped may be conveniently described and their operation understood.

It will be recalled that the motors 25 which actuate the blower fans 26 are preferably included in parallel in their operating circuit, in which may also be included the motor 31 which drives the pump 30, and this is to be borne in mind at the present time for the reason that is preferred and intended that the blowers, designated generally as 27, shall be in operation at or before the energization of the heating elements 24, so that the latter may not become overheated.

Accordingly, the controlling means are so designed as to accomplish the above desirable result, and for that purpose the following devices, circuits and connections have been supplied; the resistor 24 is connected through conductor 41 to the terminal T² of the trolley or other source of current. The other terminal, representing the opposite side of the source of potential, is represented by reference character T¹ and a conductor 42 leads therefrom to a contact point 43 of an electro-magnetic device 44. The armature 45 of this device is connected at its pivot 46 to conductor 47 leading to the other terminal 48 of the resistor 24.

When the parts are in the position shown in Fig. 1, the connection between the terminals T¹ and T² is broken at the electro-magnetic device 44.

The circuit between T¹ and T² is controlled by the armature 45 of the electro-magnetic device 50. When this electro-magnetic device 50 is energized the armature 45 is raised and connection is made between the terminals T¹ and T². The electro-magnetic device 50 is energized by a circuit from the positive pole of a battery B by wire 51. The circuit continues by wire 96 to contact 55 and thence is continued to contact 56 when the bridge 54 is raised by solenoid 52. From contact 56 it continues by wire 58 to thermostatic device S' and thence by wire 59 to the negative terminal of the battery B. From the above description it will be seen that electromagnetic device 50 cannot be energized and armature 45 cannot be raised unless electro-magnetic device 52 is energized. Electro-magnetic device 52 is energized by a circuit from the positive terminal of the battery B by wire 51 and thence by wire 61, motor 25, wire 62, contact 64, bridge 66, contact 63, wire 62, manually operable switch S² and thence to the negative terminal of the battery B. It will also be seen that the circuit for electro-magnetic device 52 cannot be closed unless the thermostat bridge 66 connects contacts 64 and 63 and the motor 25 is operating.

The energizing circuit for the air-circulating motors 25 (these being disposed in multiple) originates at connection 60 between solenoid 57 and the lead 51 from B+ pole of the battery, from which point conductor 61 runs to the fan motor 25, and a return conductor 62 leads to the negative pole B— of the battery.

This conductor is provided with a manually operable switch S² which may be normally open as indicated in Fig. 1.

The conductor 62 is broken normally at 63, 64 these characters designating opposite sides of a gap, for the purpose of bridging which at times I have provided a thermostat 65 desirably of the Sylphon type, having a bridge piece 66 normally held out of bridging contact, as shown in Fig. 1.

This thermostat is responsive to a demand for heat in the passenger compartment greater than that which can be supplied by the fluid-filled heater 13, and if the manually operable switch S² be left in a closed position, then if the thermostat 65 operates to bridge contacts 63, 64 current will flow from the battery B through the conductor 51, coil 57 and thence by conductor 61, fan motors 25, bridge member 66, conductor 62 and switch S² to the negative pole of the battery. All of the motors will thereby be energized, including motor 31 which operates pump 30, and is connected by conductors 37 and 35 to main 51, and by conductor 36 to main 62.

It will be noted that at the same time that thermostat 65 causes the gap at 63, 64 to be bridged, it thereby causes solenoid 57 to raise plunger 53 and by means of bridge piece 54 to close the gap between contact points 55 and 56, so that current can flow from battery terminal B+ through conductor 51 and solenoid 50 to conductor 69, and bridging member 54 (now closed) to conductor 58 and conductor 59 leading to the negative battery terminal B—.

The effect of this arrangement is such that the fan motors 25 of blowers 27 will be started before current is allowed to pass through the heating resistors 24. The relay circuits are closed in the following order: Circuit of solenoid 50 of electro-magnetic switch 44 will operate the armature 45 into contact with point 43 so that current will flow between terminal T², conductor 41 and resistors 24, through conductor 47, armature 45 and conductor 42 to source terminal T¹, thus energizing the resistors 24.

The condition of energization above described only obtains as long as thermostat 65 is responsive to a demand for extra heat of a given degree in the passenger compartment C. When the temperature of the passenger compartment reaches a degree above the predetermined point, the thermostat 65 will break the contact of its bridge piece 66, thus opening the gap between contacts 63 and 64, the solenoid 57 will be de-energized and the bridge piece 54 will drop, opening the gap at points 55, 56, accompanied by de-energization of solenoid 50, so that the armature 45 of the electro-magnetic switch 44 will drop away from contact point 43, breaking the heating circuit in which are included the resistor elements 24, and said resistors are thus de-energized.

At the same time, however, the flow of current energizing the motors of blowers 27 may desirably continue, in order to circulate the air already contained in compartment C, and still heated by its passage through heating element 13, and such operation of the electric motors may be provided for, to circulate air even when no heat is being supplied from any source other than that of the atmosphere, the bodies of passengers and the other minor heat-producing concomitants of bus operation. This may be accomplished by any conventional or suitable means (not shown).

As an additional safety factor, the last named circuit 51, 50, 69, 58 and 59 is protected, as at S', by the thermostat already mentioned which may be of the ordinary bi-metallic type and which will open the control circuit when the excess of heat in compartment 22, caused by overheating of resistors 24, or other overheating effect, creates the necessary expansion of thermostat S'. As long as this circuit is open at S' the heating circuit of resistors 24 will be broken, and cannot be re-established until the overheated condition no longer obtains.

At times when the engine 1 is out of operation, it will be understood without further description that activating current for the resistors 24 will be derived from the trolley terminals through points T¹ and T² in the same manner as that already described.

At the same time, if the temperature of the outer air is so low as to endanger the engine 1 by freezing the circulating fluid in jackets 4 and radiator 2, the circulating system may be reversed by manually operated switch 37, so that the auxiliary pump or impeller 30 will be operated by motor 31 and will cause circulation of fluid in conduits 14, 15, in the same direction as that of the arrow 3X in Fig. 1 the valve 33 serving to prevent passage of fluid through the by-pass 32. The pump 3 may be left in circuit inasmuch as only a relatively small amount of heat used need be transferred to warm the radiator 2, the jacket 4, etc., and the pump 3 merely acts to retard the flow somewhat. Such feeble flow is also adequate ordinarily to keep the engine sufficiently warm to facilitate the operation of starting when the engine is again put into service. If thermostat contacts 63, 64 and 66 are open the circuit above described for motor 31 would be open, so a by-pass has been provided including wire 70, manually operable switch 71 and wire 72, so that circuit may be closed between 63 and 64 by closing manually operable switch 71 when the thermostat is exposed to too great a heat, so that 63 and 64 are not connected by 66.

It will be understood without further description that the heat interchange between radiator 13 and the engine when the system is thus reversed, is derived from air passing over resistors 24 and through the fluid-filled element 13 in transit to the compartment C, so that the electrical heating element 24 thus serves both to heat the compartment C and to warm the engine, for the double purpose of preventing it from freezing and to facilitate starting.

The foregoing description applies, in all essential particulars that relate to the present invention, when the same is utilized to furnish heat to the passenger compartment of an "all-purpose" bus of the "gas-trolley" type to which reference was made briefly in the opening paragraphs of the present specification. The last-named type of bus differs from the "gas-electric" type chiefly in the omission of the generator 7, the "gas-trolley" bus deriving its supply of energizing current for the heating resistors 24 from the trolley circuit, the current entering through the trolley pole at T¹ and passing to ground or to a return trolley wire through terminal T².

Although applicant has shown and described his invention for use in connection with what is commonly known as an "all-purpose" bus, it is to be understood that he does not thereby exclude the use thereof in any other form of automotive vehicle in which it may be usefully employed, because the disclosure of the invention herein contained is amply sufficient to enable one skilled in the art to make full use of applicant's invention in other applications thereof.

Although I have particularly described one physical embodiment of my invention, and the principle and construction thereof, nevertheless, I desire to have it understood that the form selected is merely illustrative, but does not exhaust the possible physical embodiments of the idea of means underlying my invention.

What I claim as new and desire to secure by Letters Patent of the United States, is:

1. In a heating system, an internal combustion engine, a body of fluid for cooling said engine; a radiator with connections adapted for intercirculation of fluid to and from said engine; an electrically heated element associated with said radiator whereby fluid in said radiator may receive heat from said electrically heated element, and such heat may be transferred by said fluid to said engine; a pump operated by said engine, to effect said intercirculation of fluid when the engine is in operation, and an auxiliary impeller included in said connections and adapted to effect intercirculation when the engine is not in operation.

2. In a heating system, an internal combustion engine, a body of fluid for cooling said engine; a radiator with connections adapted for intercirculation of fluid to and from said engine; an electrically heated element associated with said radiator whereby fluid in said radiator may receive heat from said electrically heated element, and such heat may be transferred by said fluid to said engine; a pump, operated by said engine, to effect said intercirculation of fluid when the engine is in operation, and an auxiliary impeller included in said connections and adapted to effect intercirculation when the engine is not in operation, said auxiliary impeller being electrically operated.

3. A heating system characterized by the elements combined and cooperating as in claim 1, said system being further characterized by having by-pass in said connection to permit flow of said fluid around said impeller when said engine is in operation.

4. A heating system characterized by the elements combined and cooperating as in claim 1, said system being further characterized by having a by-pass in said connection to permit flow of said fluid around said impeller when said engine is in operation, and a check-valve in said by-pass to constitute the same a self-acting instrumentality effective to control the direction of flow of said fluid in said connections.

5. A heating system for an "all-purpose" automotive vehicle of the gas-electric type having a power plant comprising an internal combustion engine provided with fluid-filled cooling elements including a fluid-filled radiator and fluid-circulating conduits; having also an electro-power-plant including a generating means adapted to be driven by said engine, and an electric motor; also electric operating and controlling circuits adapted to be energized by electric current derived selectively from any suitable source, such as said generator or an outside conductor of power current; and said vehicle also having means to permit manual control of said selective operation of said vehicle; said heating system being characterized by a fluid-filled heater element, conduits and a primary impelling means, energized by operation of the engine, to effect intercirculation of fluid between said heater element and the fluid-filled instrumentalities of said engine; being characterized also by a heater element adapted to be energized by electric current derived from any suitable source thereof, such as the source of power current; also by air-circulating means comprising suitable compartments associated with said fluid-circulating instrumentalities and with said electrically heated element, and constituting means to effect interchange of heat between a suitable supply of air and said heating elements respectively; blower means adapted to circulate said air in said compartments to cause delivery of heated air to the passenger compartment of said vehicle; and at least one motor to actuate said blower means; an electric battery, electric circuits, comprising a circuit including said electric motors and battery; and a circuit including said heating elements; and conductors therebetween; and controlling devices to permit selective operation of said heater elements; said instrumentalities cooperating to heat said passenger compartment selectively by heat derived from said engine and by heat derived from said source of electric current; and to heat the fluid in said conduits by heat derived from said electric heating elements at times; and an auxiliary impeller adapted to cause circulation of said fluid in the radiator and jackets when said engine is not in operation, thereby reversing said system.

6. In a heating system of the class described, in combination, a space to be heated, and a thermostat responsive to change of temperature in said space; an electrically operable heating element adapted to heat said space; a source of current available for energizing said element and provided with electrical terminals; air-circulating means, including a blower and an electric motor to actuate the same; an electric heating circuit in which are included said electrically operable heating element, a circuit-breaker comprising a relay armature adapted to establish and to break said heating circuit, and a relay coil to operate said armature, said heating circuit being connected across said terminals of the source of current; an electric battery; a motor-operating circuit in which are included said battery, the blower-motor and an electro-magnetic circuit-breaker having a coil connected in series with said blower motor, said breaker having a bridging member adapted to bridge a gap in the circuit in which said relay coil is included, the last-named circuit constituting a control circuit for the heating circuit, permitting the heating circuit to become effective only when the blower motor is also energized, thereby to avoid destructive heating of the electrical heating element, said control being further characterized by other protective and regulatory instrumentalities, including a gap in said control circuit served by a bridging means operated by a thermostat responsive to a demand for heat in the space, at which time said thermostat moves a bridging means with which it is provided, and thereby closes a gap in the battery circuit thus permitting current from said battery to operate the motor circuit and complete the control circuit, thereby also closing the heater circuit which is then energized by operating current from the main source; the control circuit being also broken, in the event of abnormal development of heat in the region of the heating element, by a second thermostat responsive to such undesirable temperatures, and acting independently from any other controlling instrument.

ROBERT J. PARSONS.